United States Patent [19]

Palmer

[11] 4,228,883
[45] Oct. 21, 1980

[54] AUTOMATIC WEAR ADJUSTER FOR BELLEVILLE SPRING CLUTCHES

[75] Inventor: Albion W. Palmer, Birmingham, Mich.

[73] Assignee: Borg-Warner Corporation, Chicago, Ill.

[21] Appl. No.: 900,452

[22] Filed: Apr. 27, 1978

[51] Int. Cl.² ............................................. F16D 13/75
[52] U.S. Cl. ................................................. 192/111 A
[58] Field of Search ...................................... 192/111 A

[56] References Cited

U.S. PATENT DOCUMENTS

| | | |
|---|---|---|
| 1,100,048 | 6/1914 | Beck . |
| 1,131,769 | 3/1915 | Borg . |
| 1,132,903 | 3/1915 | Beck . |
| 1,455,587 | 5/1923 | Hamilton . |
| 1,594,161 | 7/1926 | Evans . |
| 2,146,044 | 2/1939 | Wolfram . |
| 2,221,399 | 12/1940 | Geyer . |
| 2,280,355 | 4/1942 | Spase et al. . |
| 3,752,286 | 8/1973 | Sink ............................... 192/111 A |
| 3,938,636 | 2/1976 | Nerska . |

FOREIGN PATENT DOCUMENTS 2345620 10/1977 France .................................. 192/111 A Primary Examiner—George H. Krizmanich
Attorney, Agent, or Firm—James A. Geppert

[57] ABSTRACT

An automatic wear adjuster for a vehicle clutch actuated by a diaphragm or Belleville spring to compensate for the normal wear of the clutch friction faces during use and maintain optimum spring characteristics. The adjustment is accomplished by retaining the fulcrum surface for the spring on the pressure plate at a substantially constant position in the clutch assembly and thus maintain the installed diaphragm spring position. The fulcrum surface is provided on a separate ring operatively connected to the pressure plate and adjusted through a series of camming ramps.

12 Claims, 9 Drawing Figures

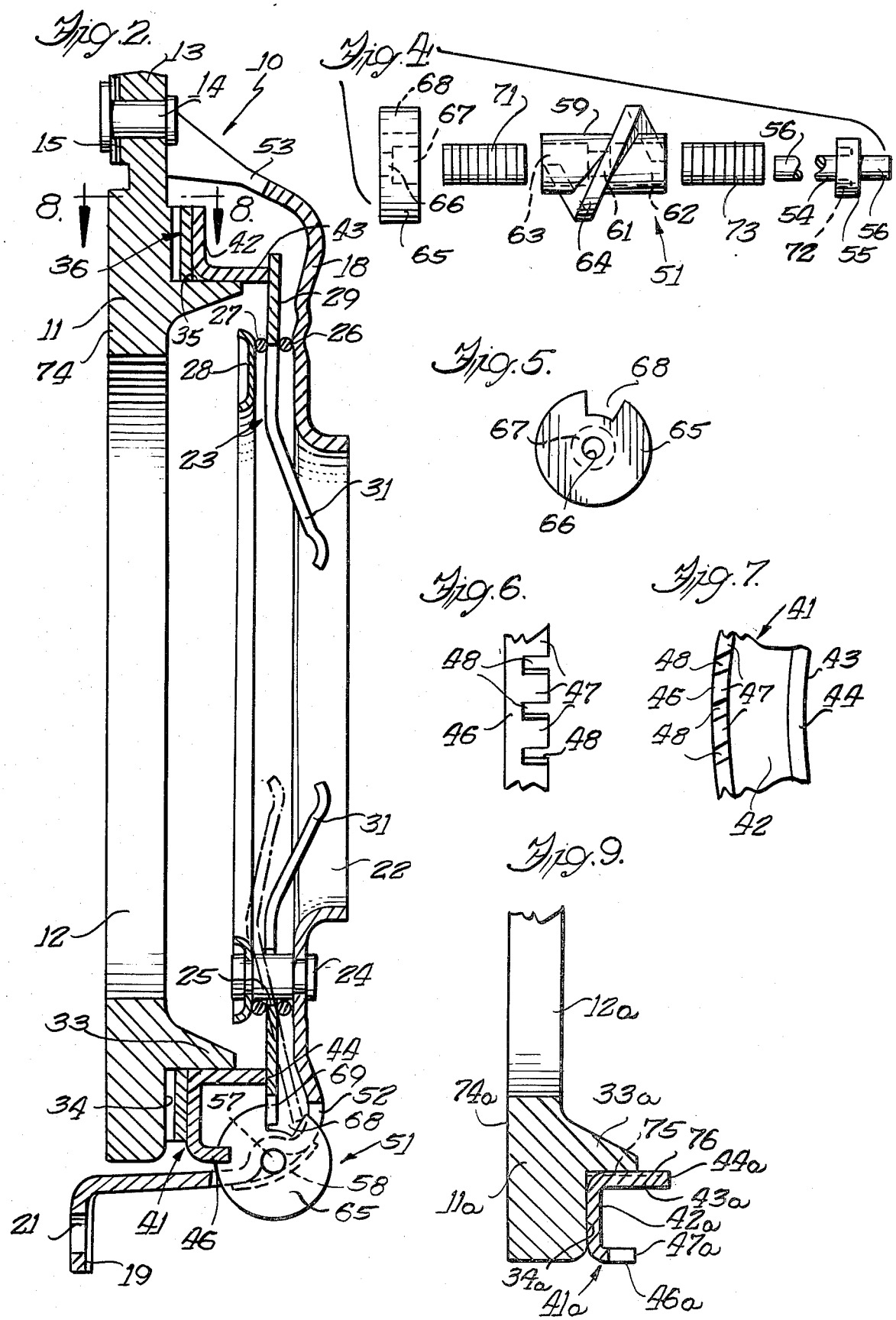

AUTOMATIC WEAR ADJUSTER FOR BELLEVILLE SPRING CLUTCHES

BACKGROUND OF THE INVENTION

Vehicle clutches of the diaphragm spring type typically include a flywheel connected to a driving shaft from the vehicle engine, a clutch disc splined onto a driven shaft leading to the vehicle transmission, an axially movable annular pressure plate rotatable with the flywheel and having a fulcrum surface on the plate surface opposite to the clutch disc, a clutch cover secured to the flywheel, a diaphragm or Belleville spring engaging the fulcrum surface of the pressure plate and a separate fulcrum on the cover, and a release bearing axially reciprocable on the driven shaft when actuated by the vehicle operator to engage radially inwardly extending fingers of the diaphragm spring. During actuation of the diaphragm spring by the release bearing to advance or retract the pressure plate, the spring pivots about wire pivot rings mounted on the clutch cover with the peripheral portion of the spring engaging the fulcrum surface of the pressure plate. Upon release and re-engagement of the clutch assembly, all of the parts will retain the same relationship.

As wear occurs to the clutch friction facings, the pressure plate moves a greater distance toward the flywheel to engage the clutch disc, with the result that the diaphragm spring moves through a greater arc of travel for complete clutch engagement. This change in pressure plate position forces the spring fingers of the diaphragm spring into greater pressure engagement with the release bearing which may bind the bearing against the release fork. To alleviate this problem, the vehicle operator must have the clutch serviced to reposition the release bearing. A large percentage of clutch failures in passenger cars have been due to neglect in maintaining proper adjustment of the clutch system.

To overcome this problem various methods of automatic adjustment were attempted with emphasis on adjustment of the release bearing carrier. Other adjustment devices appear to operate on an incremental adjustment basis. The present invention relates to an adjustment device having an infinite adjustment capability.

SUMMARY OF THE INVENTION

The present invention relates to the provision of an automatic wear adjustment device in a vehicle friction clutch of the diaphragm spring type where the adjustment occurs in the pressure plate assembly for the clutch. The adjustment device includes a fulcrum ring, an advancing ring and an actuator mechanism for the fulcrum ring. The advancing ring abuts the pressure plate, and the fulcrum ring is positioned on top of the advancing ring. A series of complementary camming ramps are formed on the rings so as to adjust the distance between the clutch disc engaging surface of the pressure plate and the fulcrum surface of the fulcrum ring as the clutch friction facings wear.

The present invention also comprehends the provision of a clutch automatic wear adjustment device having an actuator mechanism providing an infinite range of adjustment during clutch facing wear. The actuator mechanism includes a worm gear engaging peripheral teeth on the fulcrum ring and an actuator drum operatively connected to the diaphragm spring to monitor movement of the pressure plate. A pair of one-way clutch springs provide an operative connection between the actuator drum and the worm gear and an anti-backlash feature depending on the direction of rotation of the drum.

The present invention further comprehends the provision of an automatic clutch wear adjuster that maintains the original load characteristics of the diaphragm spring.

The present invention also provides an automatic wear adjuster for a vehicle friction clutch utilizing a fulcrum ring in threaded engagement with the pressure plate to provide axial movement therebetween. The actuator mechanism comprising a worm gear engaging the fulcrum ring and an actuator drum operatively connected to the diaphragm spring to monitor movement of the pressure plate provide for adjustment of the fulcrum ring as the friction facings wear during use.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a generally vertical cross sectional view taken on the irregular line 2—2 of FIG. 1.

FIG. 4 is an exploded elevational view of the actuator mechanism of FIG. 3.

FIG. 5 is an end elevational view of the actuator drum taken from the left-hand side of FIG. 4.

FIG. 6 is a partial side elevational view of the outer edge of the fulcrum ring.

FIG. 7 is a partial plan view of the fulcrum ring.

FIG. 9 is a partial cross sectional view of an alternate form of pressure plate and fulcrum ring.

DESCRIPTION OF THE PREFERRED EMBODIMENTS

Figure 1:
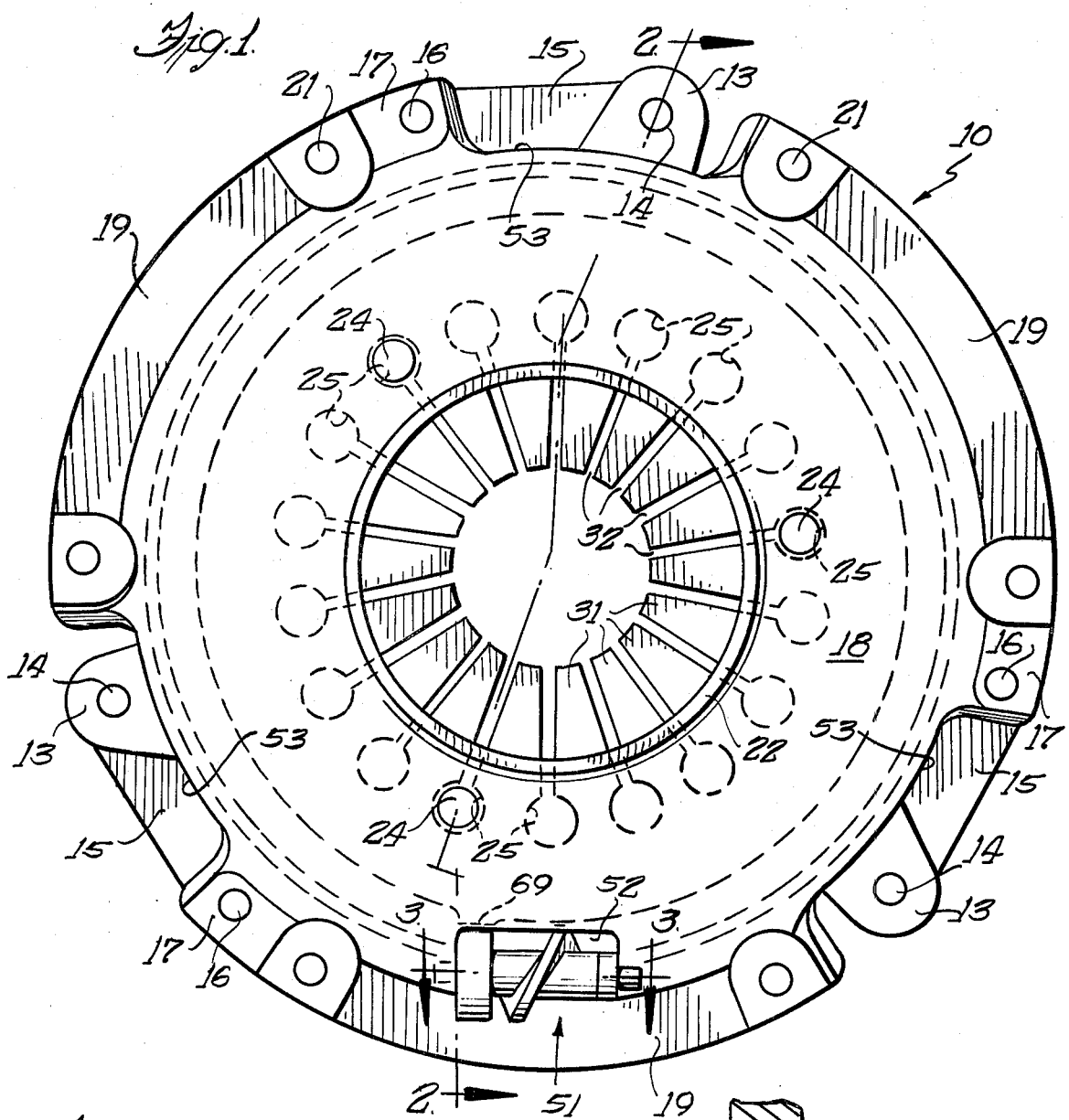
FIG. 1 is a rear elevational view of a clutch pressure plate assembly, with the flywheel, clutch disc and driven shaft omitted, incorporating the wear adjuster of the present invention.
Figure 3:
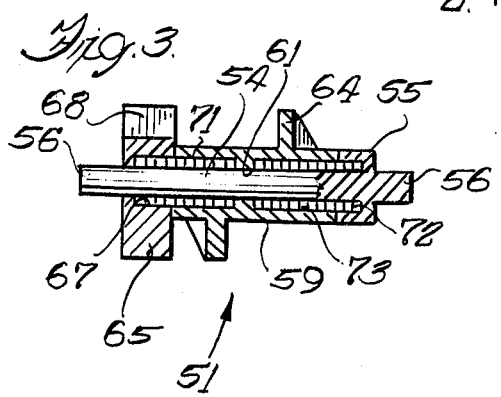
FIG. 3 is a cross sectional view of the actuator mechanism taken on the line 3—3 of FIG. 1 with the support shaft partially in elevation.
Figure 8:
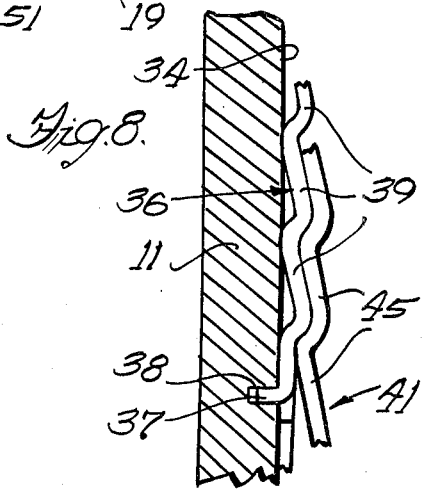
FIG. 8 is a partial cross sectional view taken on the line 8—8 of FIG. 2.

Referring more particularly to the disclosure in the drawings wherein are shown illustrative embodiments of the present invention, FIGS. 1 and 2 disclose a clutch pressure plate assembly 10 adapted for use with a flywheel on a driving shaft and a clutch disc on a driven shaft (not shown). The pressure plate assembly includes a generally annular pressure plate 11 having a central opening 12 and a plurality of circumferentially spaced drive lugs 13 extending outwardly from the periphery of the pressure plate. Secured to each lug 13 by a rivet 14 is one end of a drive strap 15, the opposite end of each strap being secured by a rivet 16 to an ear 17 formed in a clutch cover 18 substantially encompassing the pressure plate. The cover includes a discontinuous peripheral flange 19 having openings 21 for suitably securing means to fasten the cover to the flywheel. The cover also has a central opening defined by an annular flange 22 to receive the driven shaft and release bearing (not shown) for the clutch.

A diaphragm or Belleville spring 23 is mounted for pivotal movement in the cover 18 through a plurality of circumferentially spaced rivets 24 extending through suitable openings 25 in the spring 23. A pair of wire hoops 26, 27 are mounted on the rivets 24 on the opposite surfaces of the spring to provide fulcrum surfaces for the spring, and an annular ring 28 is secured to the inner ends of the rivets 24 to aid in supporting the wire hoops and the spring. The spring 23 is of conventional construction with an outer conical portion 29 and a plurality of inwardly extending fingers 31 formed by slots 32 therebetween; the slots terminating in the openings 25 adjacent the conical spring portion.

The pressure plate 11 has an annular rearwardly extending flange 33 defining an L-shaped recess with a base surface 34 and an inner wall surface 35. An annular advancing ring 36 is positioned on the base surface 34 and has a plurality of circumferentially spaced locating and locking tabs 37 formed in the generally flat ring; the tabs being bent downward to be received in openings 38 formed in the base surface 34. The ring also has a series of diametrically arranged symmetrically segmented ramps 39 for a purpose to be described later.

An annular fulcrum ring 41 is of a generally L-shape in cross section (see FIG. 2) with a base leg 42 initially contacting the advancing ring 36 and a rearwardly extending leg 43 abutting the inner wall surface 35; the leg 43 terminating in an annular fulcrum edge or surface 44 adapted to be contacted by the conical portion 29 of the diaphragm spring adjacent its periphery. Formed in the base leg 42 are a series of diametrically arranged symmetrically segmented ramps or camming means 45 complementary to and initially fully engaging the ramps 39 on the advancing ring 36. Also, a rearwardly extending flange segment 46 is formed on the outer periphery of the fulcrum ring and provided with a plurality of circumferentially spaced teeth 47 defined by notches 48 (see FIGS. 2, 6 and 7). These teeth are operatively connected to an advancing mechanism 51.

The advancing mechanism is located in an opening 52 in the clutch cover 18; the cover also having spaced openings 53 to receive the lugs 13 and drive straps 15 of the pressure plate. The advancing mechanism includes a support shaft 54 having a flange 55 adjacent one of the shaft ends 56; the shaft ends 56, 56 being non-rotatably secured in suitable depressions 57 formed in the clutch cover 18 by retaining plates 58 (see FIG. 2) suitably secured to the clutch cover. Rotatably supported on the shaft 54 is a worm member 59 having a central passage 61 receiving the shaft with opposite counterbored recesses 62, 63 and an exterior worm 64 adapted to engage the notches 48 and teeth 47. Also rotatably mounted on the shaft 54 is an actuator drum 65 having a central passage 66 receiving the shaft and a counterbored recess 67 facing the recess 63 of the worm member. A slot 68 is formed on the periphery of the drum to receive a tab 69 formed on the periphery of the diaphragm spring 23 (see FIG. 2).

A one-way actuator clutch spring 71 is located on the shaft 54 and received in the recesses 63 and 67 of the abutting worm member 59 and actuator drum 65, respectively. The worm member 59 also abuts the flange 55 which has an annular recess 72 formed therein facing the worm member, and a one-way antibacklash clutch spring 73 is received in the recesses 62 and 72 of the worm member 59 and flange 55, respectively.

When assembled, the advancing ring 36 rests on the pressure plate 11 and is prevented from rotating relative to the pressure plate by the lanced tabs 37 fitting into the blind holes 38. The fulcrum ring 41 is positioned relative to the advancing ring 36 so that the ramps 39 and 45 are matched in the fully de-adjusted position. The tab 69 on the diaphragm spring 23 monitors the spring position and initiates adjustment through the worm member 59 meshing with the teeth 47 on the fulcrum ring.

With the pressure plate 11 fully engaging the clutch disc (not shown), the diaphragm spring is in the full line position (FIG. 2), with the tab 69 located in the slot 68 of the actuator drum 65. The actuator mechanism is self-positioning in that the tab 69 will position the actuator drum 65 on the first disengagement and re-engagement cycle of the clutch. To disengage the clutch, a release bearing (not shown) engages the spring fingers 31 to move the spring 23 to the dotted line position, with the spring pivoting about the wire hoop 27 to release the pressure plate; the drive straps 15 acting to retract the pressure plate. When the release bearing is retracted, the diaphragm spring 23 pivots about the wire ring 26 to engage the fulcrum edge 44 of the fulcrum ring 41 and urge the pressure plate 11 toward the clutch disc and flywheel. During normal conditions of disengagement and re-engagement of the clutch, the tab 69 moves back and forth in the slot 68 of the drum 65 without readjusting the pressure plate position.

As facing wear of the clutch disc occurs, the pressure plate moves closer to the flywheel and the spring fingers 31 move closer to the release bearing. Because of the axial repositioning of the pressure plate 11 and the angular repositioning of the diaphragm spring 23 upon clutch wear, the tab 69 also has been repositioned forcing the actuator drum 65 to rotate counterclockwise, as seen in FIG. 2, into the clutch adjust mode; the one-way spring clutch 71 allowing the drum to slip relative to the worm member 59. Upon the next clutch cycle, when the clutch is disengaged, the tab 69 is shifted to engage the opposite side of the slot 68 forcing the actuator drum 65 to rotate clockwise; the one-way spring clutch 71 engaging during clockwise rotation to cause clockwise rotation of the worm member 59. As the worm member rotates, the worm 64 meshing with the teeth 47 on the flange 46 causes the fulcrum ring 41 to rotate counterclockwise as seen in FIG. 1 relative to the advancing ring 36 and pressure plate 11. In view of the cooperation of the ramps 39 and 45, the fulcrum ring advances up the ramps 39 on the advancing ring 36 to move the pressure plate closer to the flywheel. Thus a new pressure plate friction surface 74 to fulcrum edge 44 dimension has been established. As the clutch is re-engaged, the one-way anti-backlash spring 73 engages to prevent the worm member 59 from returning to its de-adjusted position under all operation conditions. The fulcrum ring remains in its new adjusted position until further clutch facing wear occurs, when a further adjustment takes place.

FIG. 9 discloses an alternate embodiment of the present invention with like parts having the same reference numeral with the addition of a script *a*. The clutch pressure plate 11*a* has a central opening 12*a* and a rearwardly extending annular flange 33*a*. An L-shaped recess having a base surface 34*a* and a threaded inner wall 75 receives an annular fulcrum ring 41*a* therein. The fulcrum ring consists of a base leg 42*a*, a rearwardly extending leg 43*a* and a flange segment 46*a* formed with a plurality of teeth 47*a*. The surface of the leg 43*a* facing the flange 33*a* is threaded at 76.

In view of the threaded engagement between the pressure plate flange 33a and the leg 43a of the fulcrum ring 41a, the advancing ring of the first embodiment is not required, and the adjustment of the dimension between the friction surface 74a of the pressure plate and the fulcrum edge 44a of the fulcrum ring is adjusted due to rotation of the fulcrum ring relative to the pressure plate upon operation of the actuating mechanism, which is identical to that shown in FIGS. 1 through 5.

I claim:

1. An automatic wear compensator for use in a diaphragm spring-actuated clutch assembly having a flywheel and a friction clutch disc with friction facings adapted for engagement by a pressure plate and subject to wear during use, a clutch cover, an annular pressure plate having a friction surface and a diaphragm spring pivotally mounted in said cover and adapted to urge the pressure plate into engagement, the wear compensator comprising a fulcrum ring on the pressure plate having a rearwardly extending annular flange providing a fulcrum edge cooperating with said diaphragm spring, said pressure plate having an annular recess receiving said fulcrum ring, camming means interposed between said pressure plate and said fulcrum ring to alter the distance between the pressure plate friction surface and the fulcrum edge upon relative rotation therebetween, and means sensing wear by sensing the extent of pivotal movement of the diaphragm spring comprising a peripheral tab on said diaphragm spring, a worm member operatively connected to the fulcrum ring, and an actuator drum actuating said worm member and having a recess receiving said spring tab.

2. An automatic wear compensator for use in a diaphragm spring-actuated clutch assembly having a flywheel and a friction clutch disc with friction facings adapted for engagement by a pressure plate and subject to wear during use, a clutch cover, an annular pressure plate having a friction surface and a diaphragm spring pivotally mounted in said cover and adapted to urge the pressure plate into engagement, the wear compensator comprising a fulcrum ring on the pressure plate having a toothed segment on its outer periphery and a rearwardly extending annular flange providing a fulcrum edge cooperating with said diaphragm spring, said pressure plate having an annular recess receiving said fulcrum ring, camming means interposed between said pressure plate and said fulcrum ring to alter the distance between the pressure plate friction surface and the fulcrum edge upon relative rotation therebetween, and means sensing wear by sensing the extent of pivotal movement of the diaphragm spring and operatively connected to the fulcrum ring, said sensing means including a worm member meshing with said toothed segment, an actuator drum axially aligned with said worm member and adapted to be actuated by pivotal movement of the diaphragm spring, and a one-way spring clutch joining said actuator drum and worm member in one direction of rotation.

3. An automatic wear compensator as set forth in claim 2, in which said actuator drum has a peripheral recess, and said diaphragm spring has a peripheral tab received in said recess.

4. An automatic wear compensator as set forth in claim 3, including an actuator shaft secured on said cover and rotatably mounting said actuator drum and worm member thereon, a recessed flange integral with said shaft, and a one-way anti-backlash clutch spring operatively connecting said worm member and said flange in the opposite direction of rotation of said actuator drum.

5. An automatic wear compensator as set forth in claim 4, in which said drum peripheral recess allows movement of said diaphragm spring tab during a normal clutch cycle without actuation of the drum, but the tab engages the drum where there is wear of the clutch facings.

6. An automatic wear compensator as set forth in claim 4, in which said one-way spring clutches are journalled on said shaft, and the recess in said flange faces said worm member.

7. An automatic wear compensator as set forth in claim 6, in which said actuator drum has a central passage receiving said shaft and counterbored facing said worm member to receive one end of the first mentioned one-way spring clutch, and said worm member has a central passage receiving said shaft and counterbored at both ends to receive one end of each of said one-way clutch springs, said flange recess receiving the opposite end of said anti-backlash spring clutch.

8. An automatic wear compensator for use in a diaphragm spring-actuated clutch assembly having a flywheel and a friction clutch disc with friction facings adapted for engagement by a pressure plate and subject to wear during use, a clutch cover, an annular pressure plate having a friction surface and a diaphragm spring pivotally mounted in said cover and adapted to urge the pressure plate into engagement, the wear compensator comprising a fulcrum ring on the pressure plate having a rearwardly extending annular flange providing a fulcrum edge cooperating with said diaphragm spring, said pressure plate having an annular recess receiving said fulcrum ring, camming means interposed between said pressure plate and said fulcrum ring to alter the distance between the pressure plate friction surface and the fulcrum edge upon relative rotation therebetween and comprising an advancing ring received in the annular recess of and staked to said pressure plate, said advancing ring and said fulcrum ring having two or more sets of complementary symmetrically segmented ramps, and means sensing wear by sensing the extent of pivotal movement of the diaphragm spring and operatively connected to the fulcrum ring.

9. An automatic wear compensator as set forth in claim 1, in which said camming means comprises a threaded interengagement between said pressure plate and the annular flange of said fulcrum ring.

10. An automatic wear compensator for use in a diaphragm spring-actuated clutch assembly having a flywheel and a friction clutch disc with friction facings adapted for engagement by a pressure plate and subject to wear during use, a clutch cover, an annular pressure plate having a friction surface and a diaphragm spring pivotally mounted in said cover and adapted to urge the pressure plate into engagement, the wear compensator comprising a fulcrum ring on the pressure plate having a rearwardly extending annular flange providing a fulcrum edge cooperating with said diaphragm spring and a base portion joining the annular flange with a toothed segment on the outer periphery thereof, said pressure plate having an annular recess receiving said fulcrum ring, camming means interposed between said pressure plate and said fulcrum ring to alter the distance between the pressure plate friction surface and the fulcrum edge upon relative rotation therebetween, and means sensing wear by sensing the extent of pivotal movement of the diaphragm spring including an actuator shaft secured on said clutch cover and having an integral flange adjacent one end, a worm member rotatably mounted on said shaft and meshing with said toothed segment, said worm member having a central passage receiving said shaft and counterbored at both ends, said actuator shaft flange having a recess therein facing said worm member, a one-way spring clutch encompassing said shaft and received in the counterbore at one end of said worm member and said flange recess, an actuator drum rotatably mounted on said shaft and having a central passage receiving said shaft and counterbored at one end facing said worm member, a second one-way spring clutch encompassing said shaft and received in the counterbore in the actuator drum and the counterbore at the opposite end of the worm member, said one-way clutch springs being wound in opposite directions, said actuator drum having a peripheral recess, a peripheral tab on said diaphragm spring received in said peripheral recess, said drum recess allowing movement of said spring tab during a normal clutch cycle, but said tab engages the drum where there is wear of the clutch facings, said first mentioned spring clutch joining said shaft flange and worm member to prevent backlash, and said second spring clutch joining the actuator drum and worm member for adjustment of the fulcrum ring.

11. An automatic wear compensator as set forth in claim 10, in which said camming means comprises an advancing ring received in said pressure plate recess and staked to the pressure plate, said advancing ring and said fulcrum ring having two or more sets of complementary symmetrically segmented ramps providing adjustment of said fulcrum edge upon rotation of the fulcrum ring relative to said advancing ring and pressure plate.

12. An automatic wear compensator as set forth in claim 10, in which said pressure plate includes a rearwardly extending annular flange defining an annular recess receiving said fulcrum ring, said pressure plate flange having a threaded surface, and said camming means comprises a threaded interengagement between said pressure plate flange and a threaded surface of the annular flange of the fulcrum ring to adjust the fulcrum edge upon rotation of the fulcrum ring relative to said pressure plate.

* * * * *